(12) United States Patent
Matsumura et al.

(10) Patent No.: US 11,198,351 B2
(45) Date of Patent: Dec. 14, 2021

(54) VEHICLE BODY MEMBER MANUFACTURING METHOD AND VEHICLE BODY MEMBER JOINT PORTION SEAL STRUCTURE

(71) Applicant: Toyota Jidosha Kabushiki Kaisha, Toyota (JP)

(72) Inventors: Tomoki Matsumura, Toyota (JP); Koki Ikeda, Toyota (JP); Shunsuke Kanagai, Anjo (JP); Shinya Kamimura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 125 days.

(21) Appl. No.: 16/556,780

(22) Filed: Aug. 30, 2019

(65) Prior Publication Data

US 2020/0070636 A1 Mar. 5, 2020

(30) Foreign Application Priority Data

Sep. 3, 2018 (JP) .............................. JP2018-164669

(51) Int. Cl.

| | |
|---|---|
| *B60J 10/00* | (2016.01) |
| *B60J 10/84* | (2016.01) |
| *B62D 25/02* | (2006.01) |
| *B62D 25/20* | (2006.01) |
| *B62D 65/06* | (2006.01) |
| *B29C 65/48* | (2006.01) |
| *B29C 65/00* | (2006.01) |
| *B60J 10/15* | (2016.01) |
| *B29L 31/30* | (2006.01) |

(52) U.S. Cl.
CPC ............... *B60J 10/45* (2016.02); *B29C 65/48* (2013.01); *B29C 66/721* (2013.01); *B60J 10/15* (2016.02); *B60J 10/84* (2016.02); *B62D 25/02* (2013.01); *B62D 25/2036* (2013.01); *B62D 65/06* (2013.01); *B29L 2031/30* (2013.01)

(58) Field of Classification Search
CPC ....................................................... B60J 10/45
USPC ........................................................ 296/29
See application file for complete search history.

(56) References Cited

U.S. PATENT DOCUMENTS 6,287,669 B1 * 9/2001 George .................. B60R 13/04
277/644
6,489,023 B1 * 12/2002 Shinozaki ............... C08L 63/00
428/355 EP (Continued)

FOREIGN PATENT DOCUMENTS

JP 11-317578 * 11/1999
JP 2016002925 A 1/2016

*Primary Examiner* — Dennis H Pedder
(74) *Attorney, Agent, or Firm* — Dinsmore & Shohl LLP

(57) ABSTRACT

A vehicle body member manufacturing method and a vehicle body member joint portion seal structure are obtained that are capable of suppressing sinking of a sealing material filled into a recess formed by a first member and a second member. A sealing material is filled into a recess provided between a general face of an upper end portion of center pillar R/F and a general face of side rail R/F. After the sealing material has cured, sealing material is filled into the recess on top of the initial sealing material. This enables the surface of the sealing material to be levelled, thus enabling sinking at the surface of the sealing material to be suppressed.

18 Claims, 8 Drawing Sheets

(56) References Cited

U.S. PATENT DOCUMENTS

2003/0049453 A1* 3/2003 Czaplicki ............... C08L 53/02
                                                    428/413
2016/0023293 A1* 1/2016 Kurokawa ........... B23K 1/0008
                                                    296/29

* cited by examiner

VEHICLE BODY MEMBER MANUFACTURING METHOD AND VEHICLE BODY MEMBER JOINT PORTION SEAL STRUCTURE

CROSS-REFERENCE TO RELATED APPLICATION

This application is based upon and claims the benefit of priority of the prior Japanese Patent Application No. 2018-164669, filed on Sep. 3, 2018, the entire content of which is incorporated herein by reference.

TECHNICAL FIELD

The present disclosure relates to a manufacturing method for a vehicle body member, and to a seal structure for a vehicle body member joint portion.

BACKGROUND ART

Japanese Patent Application Laid-Open (JP-A) No. 2016-002925 (Patent Document 1) discloses technology relating to a side outer panel (side member outer panel) of a vehicle body that is divided between at least a first member and a second member. In this background art, the second member is formed with a stepped portion to which an end portion of the first member is joined, and a recess is formed at a seam (joint portion) between the first member and the second member in a joined state of the first member to the stepped portion. This recess is filled with a light-cured resin sealing material in order to level between an outer face of the first member and an outer face of the second member, including at the recess, so as to make the joint portion between the first member and the second member less noticeable.

In the background art described above, the recess formed by the first member and the second member is filled with the light-cured resin sealing material. However, if the sealing material sinks during a curing stage, there is a possibility that levelling between the outer face of the first member and the outer face of the second member, including at the recess, might not be achieved.

SUMMARY

In consideration of the above circumstances, an object of the present disclosure is to provide a vehicle body member manufacturing method and a vehicle body member joint portion seal structure capable of suppressing sinking of a sealing material that has been filled into a recess formed by a first member and a second member.

A vehicle body member manufacturing method according to a first aspect is applied to a joint portion of a vehicle body member including a first member that configures a portion of the vehicle body member, and a second member that configures another portion of the vehicle body member, that is formed with a stepped portion to which the first member is joined, and that is formed such that in a state in which the first member has been joined to the stepped portion a recess is provided between the first member and the second member at a joint portion between the first member and the second member and such that an outer face of the second member is in the same plane as an outer face of the first member. The vehicle body member manufacturing method includes a first step of filling the recess with a first sealing material, and a second step of filling the recess with a second sealing material on top of the first sealing material after the first sealing material has cured.

In the vehicle body member manufacturing method according to the first aspect, the vehicle body member is configured including the first member and the second member. The second member is formed with the stepped portion to which the first member is joined. The second member is formed such that in a state in which the first member has been joined to the stepped portion, the recess is provided between the first member and the second member at the joint portion between the first member and the second member. Moreover, the outer face of the second member is in the same plane as the outer face of the first member at the joint portion between the first member and the second member.

Note that in the present disclosure, in the first step, the recess formed between the first member and the second member at the joint portion in a state in which the first member and the second member have been joined together is filled with the first sealing material. Next, in the second step, the recess is filled with the second sealing material on top of the first sealing material after the first sealing material has cured.

Were the recess at the joint portion between the first member and the second member to be filled using only the first sealing material, there would be a possibility of the surface of the first sealing material sinking during the curing stage of the first sealing material. However, in the present disclosure, the second sealing material is filled into the recess on top of the first sealing material, after the first sealing material with which the recess of the joint portion has been filled has cured.

It is thus possible to suppress sinking of the sealing material at a recess surface (note that although strictly speaking the recess surface corresponds to the second sealing material, in the filled state of the recess, this is referred to simply as the "sealing material" for the sake of convenience). Namely, it is possible to level between the outer face of the first member and the outer face of the second member, including at the recess.

Note that the "joint portion" of the present disclosure is a peripheral portion including the recess provided between the first member and the second member. Moreover, in the present disclosure, "filling" encompasses application of the sealing material. Filler materials such as thermosetting materials, light-cured materials, two-component mixture materials, or brazing materials may be employed as the "first sealing material" and the "second sealing material". The first sealing material and the second sealing material do not necessarily need to be the same material as each other. Moreover, in the present disclosure, "in the same plane" need not imply that the outer face of the first member and the outer face of the second member are disposed in a state lying perfectly flat with respect to each other, and includes cases in which the outer face of the first member and the outer face of the second member are substantially in the same plane as each other.

A vehicle body member manufacturing method according to a second aspect is the vehicle body member manufacturing method of the first aspect, wherein the first sealing material and the second sealing material are each configured by a thermosetting sealing material.

The vehicle body member manufacturing method includes, for example, drying processes to dry the vehicle body member in a drying oven after a welding process and after a coating process.

Accordingly, in the vehicle body member manufacturing method according to the second aspect, a thermosetting sealing material is employed for the first sealing material and the second sealing material. The first sealing material is filled into the recess formed between the first member and the second member during the welding process, and the second sealing material is filled into the recess during the coating process, enabling the existing drying processes to be utilized without modification. Namely, there is no need to provide a separate drying process specifically for the filling the first sealing material and the second sealing material into the recess formed between the first member and the second member.

A vehicle body member manufacturing method according to a third aspect is either the first aspect or the second aspect, wherein the second sealing material is set so as to have a shallower fill depth than the first sealing material.

Sinking of the sealing material in the recess of the joint portion becomes more pronounced the deeper the till depth of the sealing material.

Accordingly, in the vehicle body member manufacturing method according to the third aspect, the second sealing material is set so as to have a shallower fill depth than the first sealing material. Sinking of the second sealing material itself is thus suppressed, thereby enabling sinking of the sealing material at the recess surface to be suppressed.

A vehicle body member manufacturing method according to a fourth aspect is any one of the first aspect to the third aspect, wherein the vehicle body member is side member outer reinforcement configuring part of a framework member of a vehicle body side section.

For example, a side member outer panel provided to a vehicle body side section configures part of a framework member of a vehicle body side section and also configures a styling face of the vehicle body side section. The side member outer panel is formed with a side door opening, and a side door is attached at the periphery of the side door opening so as to be capable of opening and closing. An outer edge portion of the side door is provided with rubber weather strip, and the weather strip abuts the side member outer panel so as to suppress rainwater and the like from penetrating to the vehicle interior.

Levelling is demanded at an abutted face of the side member outer panel that is abutted by the weather strip. In cases in which a vehicle body side section is configured by a large side member outer panel formed as a single unit, due to the larger size variation in dimensional precision is greater than in smaller components. Accordingly, assuming the precision requirements are the same, molding large side member outer panels results in poorer yield than when molding smaller components.

Regarding this point, in the fourth aspect, in the vehicle body member, the side member outer reinforcement configuring part of the framework member of a vehicle body side section is configured by plural members.

As described above, the present disclosure is capable of suppressing sinking of the sealing material that has been filled into the recess provided between the first member and the second member at the joint portion where the first member and the second member are joined together. This thereby enables levelling between the outer face of the first member and the outer face of the second member, including at the recess.

Accordingly, sinking of the sealing material at the joint portion between the respective members can be suppressed, even in cases in which the side member outer reinforcement is configured by plural members. This thereby enables levelling to be secured at an abutting face abutted by a weather strip in the side member outer reinforcement. As a result, rainwater and the like can be suppressed from penetrating to the vehicle interior even in cases in which the side member outer reinforcement is configured by plural members.

Namely, the present disclosure enables functionality of the members configuring the vehicle body side section to be split between framework members (corresponding to the side member outer reinforcement) configuring part of the framework member of the vehicle body side section and styling members configuring styling faces of the vehicle body side section. This enables a reduction in weight of the respective members, and enables yield to be improved.

A seal structure according to a fifth aspect is applied to a joint portion of a vehicle body member including a first member that configures a portion of the vehicle body member, and a second member that configures another portion of the vehicle body member, that is formed with a stepped portion to which the first member is joined, and that is formed such that in a state in which the first member has been joined to the stepped portion a recess is provided between the first member and the second member at a joint portion between the first member and the second member and an outer face of the second member is in the same plane as an outer face of the first member. The seal structure includes a first sealing material that is filled into the recess, and a second sealing material that is filled into the recess on top of the first sealing material.

In the vehicle body member joint portion seal structure according to the fifth aspect, the vehicle body member is configured including the first member and the second member. The second member is formed with the stepped portion to which the first member is joined. The second member is formed such that in a state in which the first member has been joined to the stepped portion, the recess is provided between the first member and the second member at the joint portion between the first member and the second member. Moreover, the outer face of the second member is in the same plane as the outer face of the first member at the joint portion.

In a state in which the first member and the second member have been joined together, the first sealing material and the second sealing material that is filled on top of the first sealing material are provided in the recess formed between the first member and the second member at the joint portion. Accordingly, even if sinking occurs during the curing stage of the first sealing material that has been filled into the recess, the second sealing material is filled on top of the first sealing material, thereby enabling sinking of the sealing material at the recess surface to be suppressed.

A vehicle body member joint portion seal structure according to a sixth aspect is the vehicle body member joint portion seal structure of the fifth aspect, wherein the first sealing material and the second sealing material are each configured by a thermosetting sealing material.

In the vehicle body member joint portion seal structure according to the sixth aspect, the first sealing material and the second sealing material are each configured by a thermosetting sealing material, enabling an existing drying process to be utilized without modification to dry the first sealing material and the second sealing material.

A vehicle body member joint portion seal structure according to a seventh aspect is either the fifth aspect or the sixth aspect, wherein the second sealing material is set so as to be thinner than the first sealing material.

In the vehicle body member joint portion seal structure according to the seventh aspect, the second sealing material is set so as to be thinner than the first sealing material, enabling sinking of the second sealing material itself to be suppressed, and thereby enabling sinking of the sealing material at the recess surface to be suppressed.

A vehicle body member joint portion seal structure according to an eighth aspect is any one of the fifth aspect to the seventh aspect, wherein the vehicle body member is a side member outer reinforcement configuring part of a framework member of a vehicle body side section.

The vehicle body member joint portion seal structure according to the eighth aspect enables rainwater and the like to be suppressed from penetrating to the vehicle interior even though the side member outer reinforcement configuring part of the framework member of the vehicle body side section is configured from plural members.

As described above, the first aspect exhibits the effect of enabling sinking of the sealing material that has been filled into the recess formed between the first member and the second member to be suppressed.

The second aspect exhibits the effect of enabling an existing drying process to be utilized without modification to dry the first sealing material and the second sealing material.

The third aspect exhibits the effect of enabling sinking of the second sealing material itself to be suppressed, thus enabling sinking of the sealing material at the recess surface to be suppressed.

The fourth aspect exhibits the effect of enabling rainwater and the like to be suppressed from penetrating to the vehicle interior, even when the side member outer reinforcement is configured by plural members.

The fifth aspect exhibits the effect of enabling sinking of the sealing material that has been filled into the recess formed between the first member and the second member to be suppressed.

The sixth aspect exhibits the effect of enabling an existing drying process to be utilized without modification to dry the first sealing material and the second sealing material.

The seventh aspect exhibits the effect of enabling sinking of the second sealing material itself to be suppressed, thus enabling sinking of the sealing material at the recess surface to be suppressed.

The eighth aspect exhibits the effect of enabling rainwater and the like to be suppressed from penetrating to the vehicle interior, even when the side member outer reinforcement is configured by plural members.

DETAILED DESCRIPTION

Figure 1:
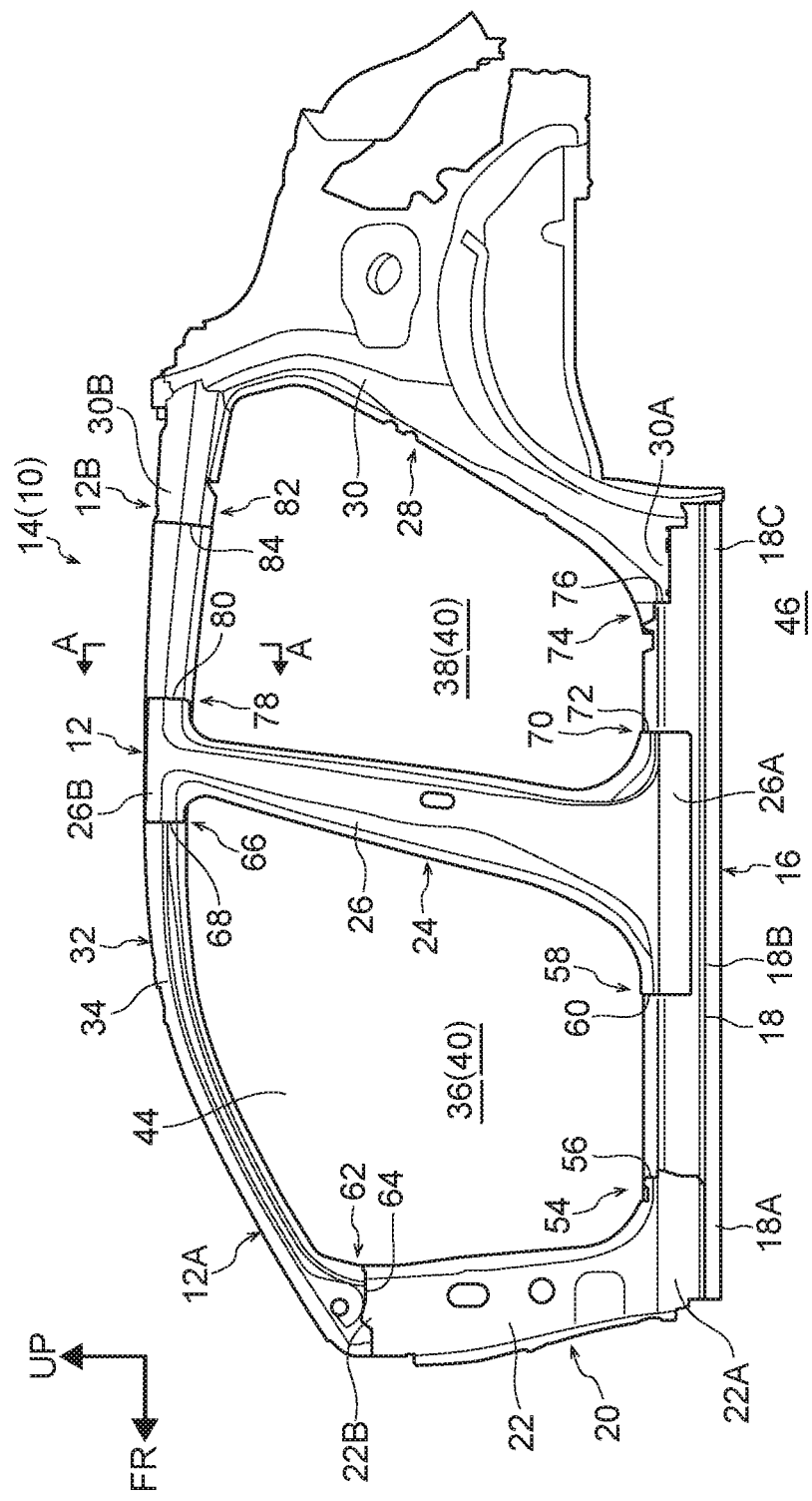
FIG. 1 is a face-on view of side member outer reinforcement serving as a vehicle body member applied with a vehicle body member joint portion seal structure according to an exemplary embodiment.

Explanation follows regarding a seal structure for a joint portion of a vehicle body member according to an exemplary embodiment of the present disclosure, with reference to the drawings. In the drawings, the arrow FR indicates a vehicle front side, the arrow UP indicates a vehicle upper side, and the arrow OUT indicates a vehicle width direction outer side. Since the configuration of the vehicle is basically left-right symmetrical, the illustrations and explanation focus on the left side of the vehicle from the perspective of a seated occupant.

Configuration of Vehicle Body Member Joint Portion Seal Structure

Figure 2:
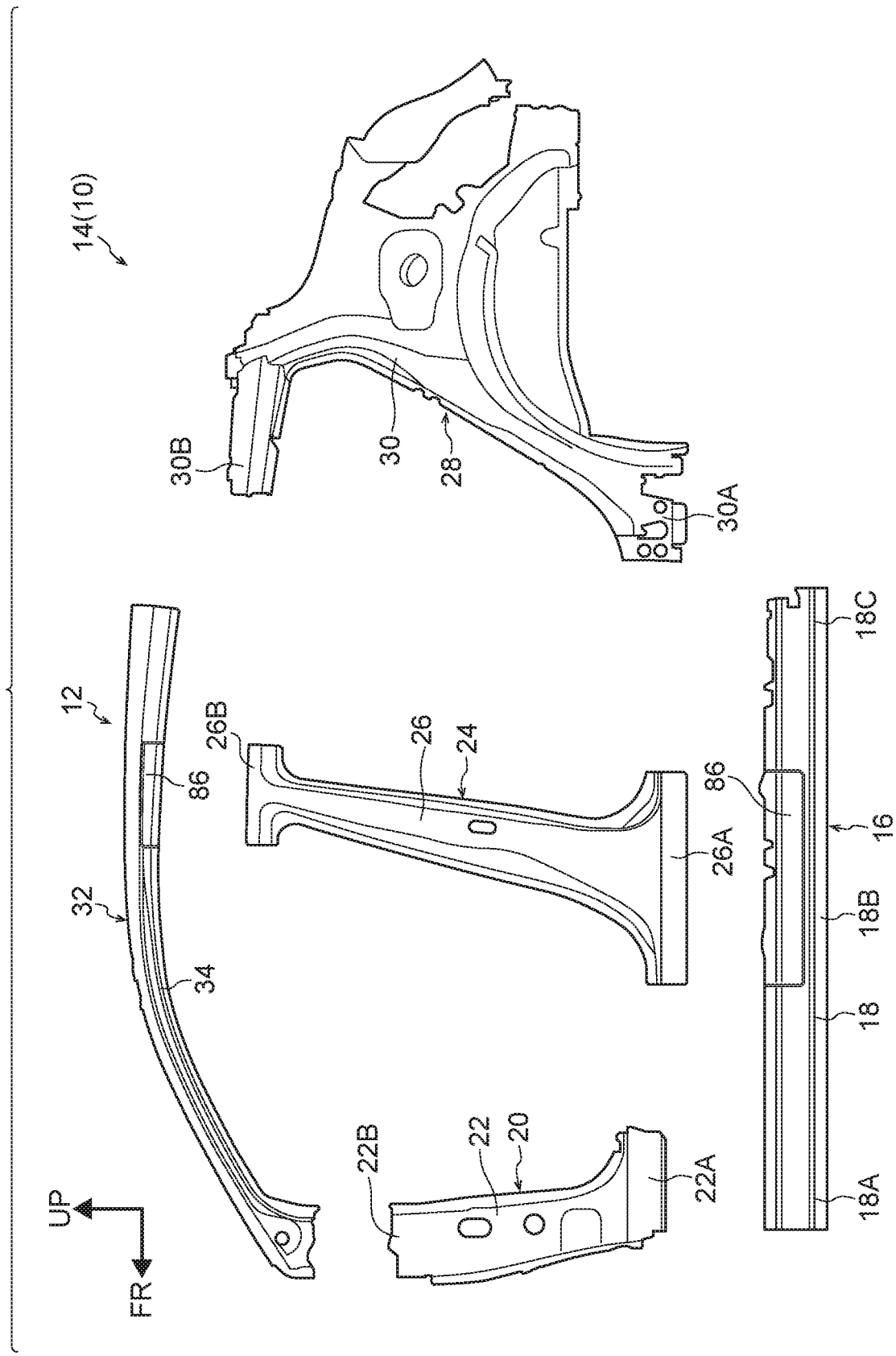
FIG. 2 is an exploded face-on view illustrating the side member outer reinforcement illustrated in FIG. 1 in an exploded state.

FIG. 1 is a face-on view illustrating side member outer reinforcement (hereafter "side member R/F") 12, serving as a vehicle body member of a vehicle 10 applied with a vehicle body member joint portion seal structure according to the present exemplary embodiment. Note that FIG. 1 is a side view seen as if viewed from the left side of the vehicle 10. FIG. 2, described later, is similar to FIG. 1 in this respect.

The side member R/F 12 illustrated in FIG. 1 configures part (a vehicle width direction outer side) of a framework member of a vehicle body side section 14. The vehicle body side section 14 includes rocker reinforcement (hereafter "rocker R/F 18") serving as a second member that configures a vehicle width direction outer side framework member of a rocker 16 that extends along the vehicle front-rear direction at a lower section of the vehicle body side section 14.

In the side member R/F 12, a lower end portion 22A of front pillar reinforcement (hereafter "front pillar R/F 22") is joined to a front end portion 18A of the rocker R/F 18. The front pillar R/F 22 serves as a first member that configures a vehicle width direction outer side framework member of a front pillar 20 provided running in the vehicle vertical direction.

In the side member R/F 12, a lower end portion 26A of center pillar reinforcement (hereafter "center pillar R/F 26") is joined to a vehicle front-rear direction central portion 18B of the rocker R/F 18. The center pillar RI/F 26 serves as a first member that configures a vehicle width direction outer side framework member of a center pillar 24 provided running in the vehicle vertical direction.

In the side member R/F 12, a lower end portion 30A of rear pillar reinforcement (hereafter "rear pillar R/F 30") is joined to a rear end portion 18C of the rocker R/F 18. The rear pillar RI/F 30 serves as a first member that configures a framework member and the vehicle width direction outer side of a rear pillar 28 provided running in the vehicle vertical direction.

In the side member R/F 12, an upper end portion 22B of the front pillar R/F 22, an upper end portion 26B of the center pillar R/F 26, and an upper end portion 30B of the rear pillar R/F 30 are respectively joined to roof side rail reinforcement (hereafter "side rail R/F 34"). The side rail R/F 34 serves as a second member configuring a framework member on the vehicle width direction outer side of a roof side rail 32 extending along the vehicle front-rear direction.

Namely, the rocker R/F 18, the front pillar R/F 22, the center pillar R/F 26, the rear pillar R/F 30, and the side rail R/F 34 are configuration members configuring the side member R/F 12. In the present exemplary embodiment, these members are, for example, formed from metal such as sheet steel, and although not illustrated in the drawings, are formed as vehicle framework that configures a closed cross-section together with framework members provided on the vehicle width direction inner side of the respective members. These members may, of course, be formed from a resin such as a fiber-reinforced plastic.

Although not illustrated in the drawings, in the present exemplary embodiment, a resin rocker molding serving as a styling member that covers the rocker R/F 18 from the vehicle outer side is attached at the vehicle width direction outer side of the rocker R/F 18. Moreover, a resin roof rail outer 35 (see FIG. 3) serving as a styling member that covers the side rail R/F 34 from the vehicle outer side is attached at the vehicle width direction outer side of the side rail R/F 34. A resin quarter panel serving as a styling member that covers the rear pillar R/F 30 from the vehicle outer side is attached at the vehicle width direction outer side of a vehicle rear section including the rear pillar R/F 30.

Although not illustrated in the drawings, a resin front fender serving as a styling member that covers the front pillar R/F 22 from the vehicle outer side is attached at the vehicle width direction outer side of the front pillar R/F 22. A resin triangular patch serving as a styling member is attached at a boundary portion between a lower edge portion of the roof side rail 32 and the front fender at the vehicle front side of the roof side rail 32. A resin quarter garnish serving as a styling member is attached at a boundary portion between a lower edge portion of the roof side rail 32 and the quarter panel at the vehicle rear side of the roof side rail 32. Note that these styling members may also be formed from metal, for example sheet steel.

A substantially rectangular front side door opening 36 is formed at a front section 12A side of the side member R/F 12 by the rocker R/F 18, the front pillar R/F 22, the side rail R/F 34, and the center pillar R/F 26. The front side door opening 36 is capable of being opened and closed by a front side door, not illustrated in the drawings.

A substantially rectangular rear side door opening 38 is formed at a rear section 12B side of the side member R/F 12 by the rocker R/F 18, the center pillar R/F 26, the side rail R/F 34, and the rear pillar R/F 30. The rear side door opening 38 is capable of being opened and closed by a rear side door 48. Closing off the respective side door openings 40 with corresponding side doors 42 (see FIG. 3) partitions a vehicle interior 44 side from a vehicle exterior 46 side.

Figure 3:
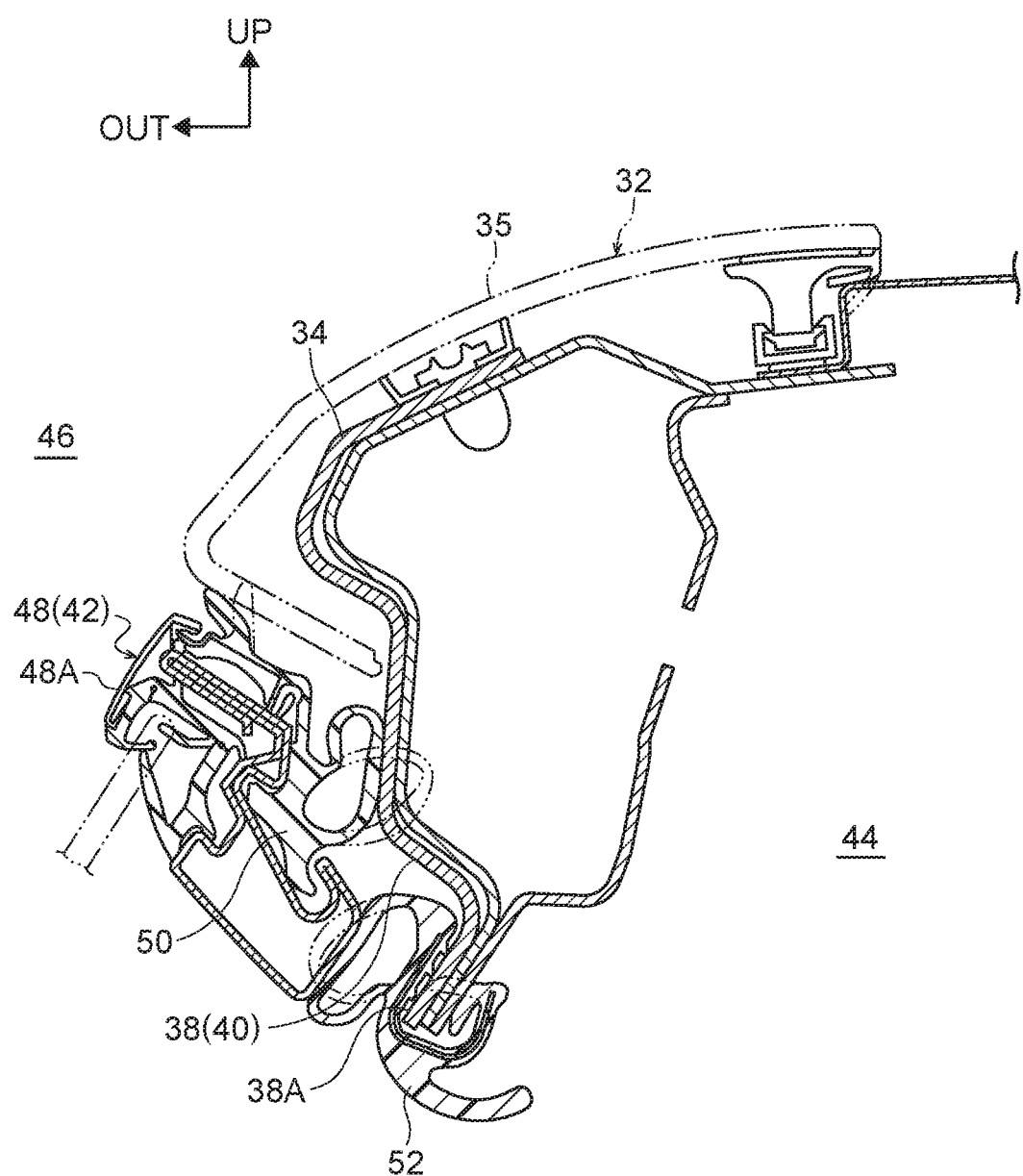
FIG. 3 is a cross-section sectioned along A-A in FIG. 1.

FIG. 3 is a cross-section sectioned along A-A in FIG. 1. As illustrated in FIG. 3, an outer edge portion 48A of a rear side door 48 is provided with a ring-shaped weather strip 50 that is made of rubber and that encircles the rear side door 48. The rear side door opening 38 is also provided with a ring-shaped door opening trim 52 that is made of rubber and that runs along an inner edge portion 38A of the rear side door opening 38. Although not illustrated in the drawings, configuration on the front side door side is substantially the same as on the rear side door 48 side.

Note that in the present exemplary embodiment, as described above, the side member R/F 12 illustrated in FIG. 2 is configured including the rocker R/F 18, the front pillar R/F 22, the center pillar R/F 26, the rear pillar R/F 30, and the side rail R/F 34. Note that FIG. 2 is an exploded face-on view illustrating the side member R/F 12 illustrated in FIG. 1 in an exploded state.

The lower end portion 22A of the front pillar R/F 22, the lower end portion 26A of the center pillar R/F 26, and the lower end portion 30A of the rear pillar R/F 30 are each joined to the rocker R/F 18. The upper end portion 22B of the front pillar R/F 22, the upper end portion 26B of the center pillar R/F 26, and the upper end portion 30B of the rear pillar R/F 30 are each joined to the side rail R/F 34.

As illustrated in FIG. 1, on the front side door opening 36 side, a break line 56 is provided at a joint portion 54 between the rocker R/F 18 and the lower end portion 22A of the front pillar R/F 22, and a break line 60 is provided at a joint portion 58 between the rocker R/F 18 and the lower end portion 26A of the center pillar R/F 26. A break line 64 is also provided at a joint portion 62 between the side rail R/F 34 and the upper end portion 22B of the front pillar R/F 22, and a break line 68 is provided at a joint portion 66 between the side rail R/F 34 and the upper end portion 26B of the center pillar R/F 26.

On the rear side door opening 38 side, a break line 72 is provided at a joint portion 70 between the rocker R/F 18 and the lower end portion 26A of the center pillar R/F 26, and a break line 76 is provided at a joint portion 74 between the rocker R/F 18 and the lower end portion 30A of the rear pillar R/F 30. A break line 80 is also provided at a joint portion 78 between the side rail R/F 34 and the upper end portion 26B of the center pillar R/F 26, and a break line 84 is provided at a joint portion 82 between the side rail R/F 34 and the upper end portion 30B of the rear pillar R/F 30.

Explanation follows regarding the vehicle body member joint portion seal structure according to the present exemplary embodiment.

Figure 4:
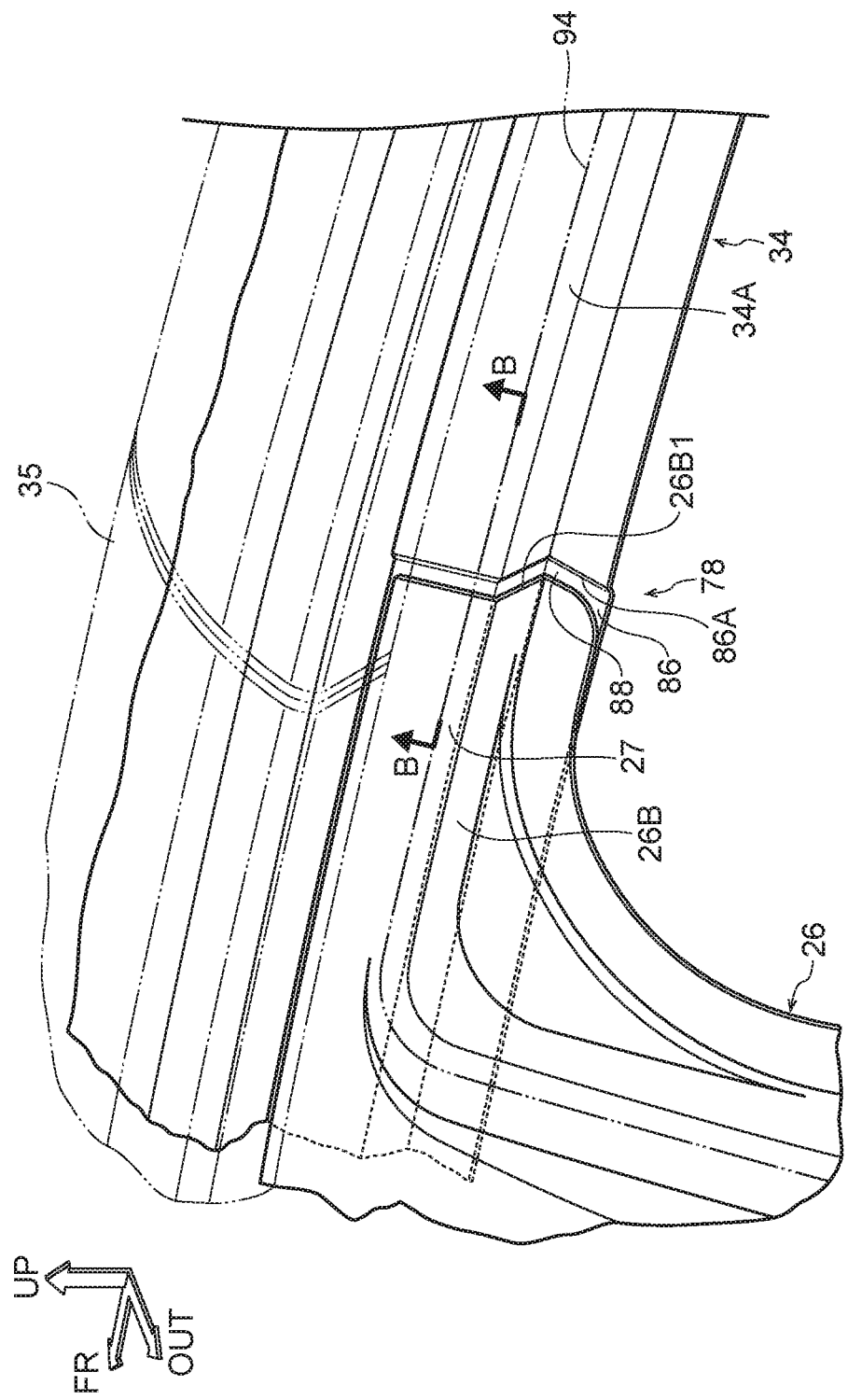
FIG. 4 is a perspective view illustrating a joint portion between side rail R/F and center pillar R/F illustrated in FIG. 2, as viewed from a vehicle rear and vehicle width direction outer side.
Figure 5A:
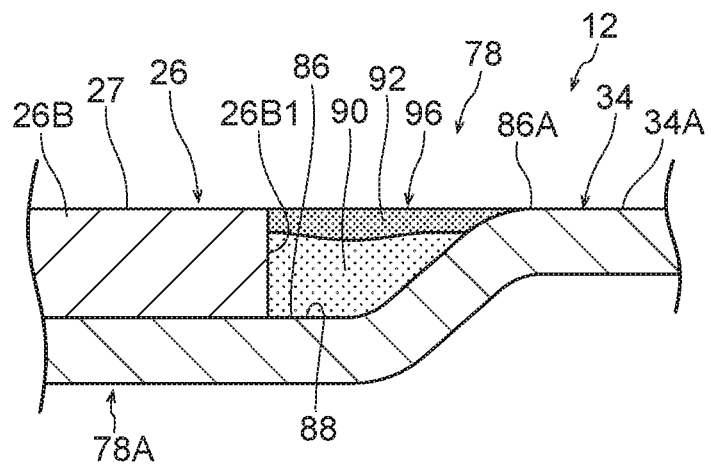
FIG. 5A is a cross-section illustrating a joint portion seal structure as sectioned along B-B in FIG. 4.
Figure 5B:
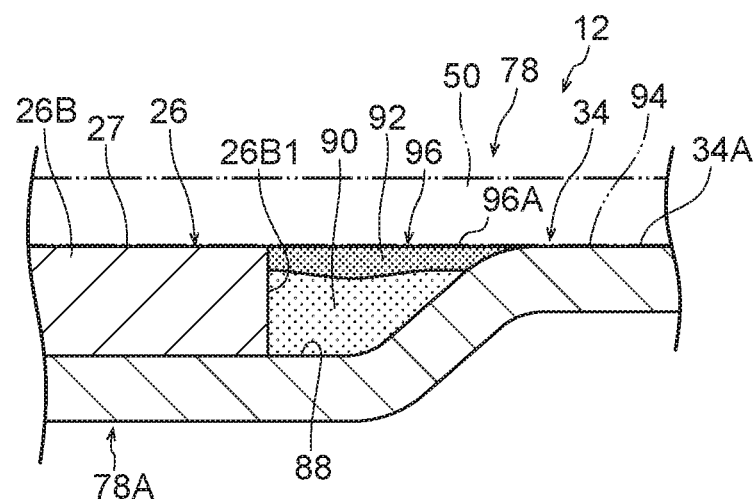
FIG. 5B is a cross-section illustrating a state in which a weather strip abuts a joint portion.

In the present exemplary embodiment, the joint portions 54, 58, 62, 66, 70, 74, 78, and 82 have substantially the same configuration as each other, and so explanation is given regarding the joint portion 78 as a representative thereof. FIG. 4 is a perspective view illustrating the joint portion 78 between the side rail R/F 34 and the upper end portion 26B of the center pillar R/F 26 as viewed from the vehicle rear and vehicle width direction outer side. FIG. 5A and FIG. 5B are cross-sections sectioned along B-B in FIG. 4.

As illustrated in FIG. 2, FIG. 4, and FIG. 5A, the side rail R/F 34 is formed with a stepped portion 86 projecting toward the vehicle width direction inner side. The upper end portion 26B of the center pillar R/F 26 is joined to the stepped portion 86.

As illustrated in FIG. 4 and FIG. 5A, in the present exemplary embodiment, as described above, the side rail R/F 34 and the center pillar R/F 26 are formed from metal, for example sheet steel. The upper end portion 26B of the center pillar R/F 26 is thus joined to the stepped portion 86 of the side rail R/F 34 by welding or the like at the joint portion 78 (a join 78A) between the side rail R/F 34 and the upper end portion 26B of the center pillar R/F 26. Note that in cases in which these members are formed using fiber-reinforced plastic, they may for example be joined by welding or using an adhesive at the join 78A.

Note that the join 78A of the present exemplary embodiment is a location where the upper end portion 26B of the center pillar R/F 26 is joined to the stepped portion 86 formed to the side rail R/F 34. The joint portion 78 of the present exemplary embodiment is a peripheral location including a recess 88, described later, that is provided between a general face 27 of the upper end portion 26B of the center pillar R/F 26 and a general face 34A of the side rail R/F 34. Note that in cases in which the side rail R/F 34 and the center pillar R/F 26 are formed using a resin such as a fiber-reinforced plastic, the upper end portion 26B of the center pillar R/F 26 is, for example, joined to the stepped portion 86 of the side rail R/F 34 by welding or using an adhesive.

At the joint portion 78 between the side rail R/F 34 and the upper end portion 26B of the center pillar R/F 26, the recess 88 is provided between a rear end 26B1 of the upper end portion 26B of the center pillar R/F 26 and a boundary 86A between the general face 34A of the side rail R/F 34 and the stepped portion 86. The recess 88 is, for example, filled with a thermosetting sealing material (first sealing material) 90 and sealing material (second sealing material) 92.

As illustrated in FIG. 5B, at the joint portion 78, the general face 27 of the upper end portion 26B of the center pillar R/F 26 and the general face 34A of the side rail R/F 34 are set substantially in the same plane as each other. The general face 27 of the upper end portion 26B of the center pillar R/F 26 and the general face 34A of the side rail R/F 34 are abutted by the weather strip 50 that straddles the break line 80 at the joint portion 78 (an abutting portion 94).

A sealing material 96 (configured by layering the sealing material 92 on top of the sealing material 90) fills the recess 88 provided between the general face 27 of the upper end portion 26B of the center pillar R/F 26 and the general face 34A of the side rail R/F 34. A surface 96A of the sealing material 96 is set substantially in the same plane as the general face 27 of the upper end portion 26B of the center pillar R/F 26 and the general face 34A of the side rail R/F 34.

Vehicle Body Member Manufacturing Method and Operation and Effects of Vehicle Body Member Joint Portion Seal Structure First, explanation follows regarding a vehicle body member manufacturing method according to the present exemplary embodiment.

Figure 6A:
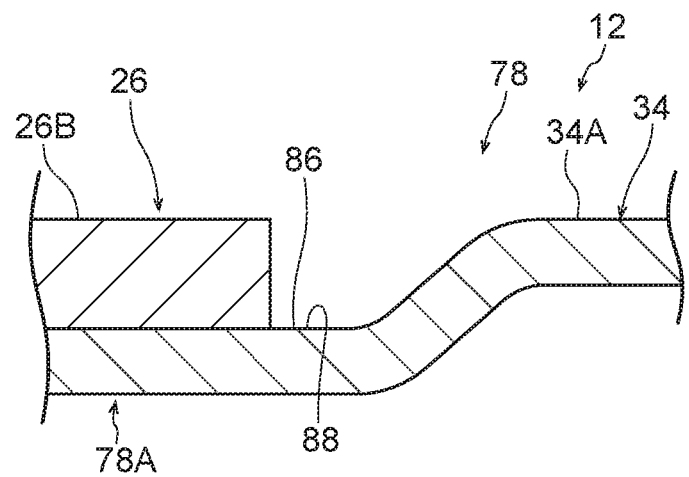
FIG. 6A is a cross-section illustrating a joint portion seal structure as sectioned along B-B in FIG. 4.

As illustrated in FIG. 6A, in the present exemplary embodiment, the upper end portion 26B of the center pillar R/F 26 is joined to the stepped portion 86 formed to the side rail R/F 34 at the joint portion 78 between the side rail R/F 34 configuring part of the side member R/F 12 and the upper end portion 26B of the center pillar R/F 26 (at the join 78A).

Figure 6B:
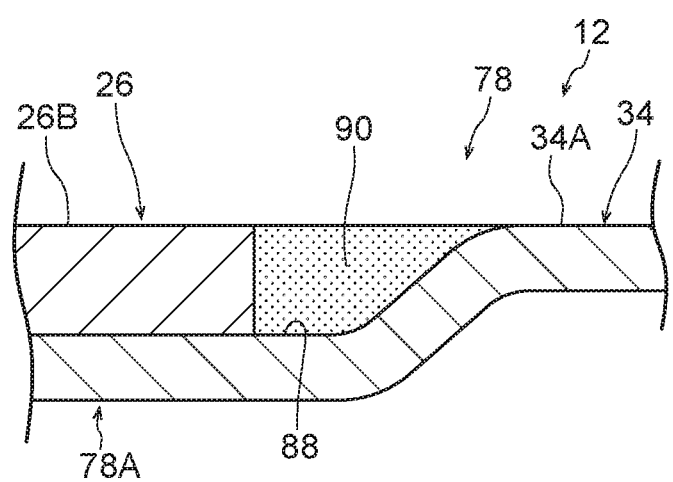
FIG. 6B is a cross-section illustrating a state in which a recess provided to a joint portion has been filled with a first sealing material.

In a first step, as illustrated in FIG. 6B, the thermosetting sealing material 90 is filled into the recess 88 provided between the general face 27 of the upper end portion 26B of the center pillar R/F 26 and the general face 34A of the side rail R/F 34.

Figure 8A:
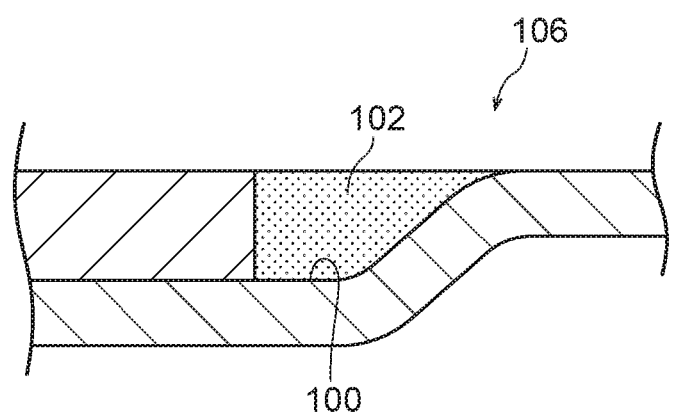
FIG. 8A is a cross-section of a comparative example, illustrating in a state in which a recess provided to a joint portion has been filled with a sealing material.
Figure 8B:
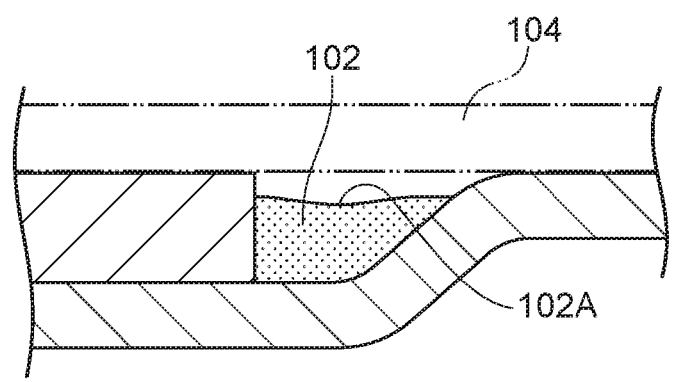
FIG. 8B is a cross-section of a comparative example, illustrating a sunken state of a sealing material with which a recess provided to a joint portion has been filled.

Explanation follows regarding a comparative example of a case in which a sealing material 102 is filled into a recess 100 of a joint portion 108, as illustrated in FIG. 8A. In this case, during the curing stage of the sealing material 102, there is a possibility of the sealing material 102 sinking such that a surface 102A of the sealing material 102 is no longer level, as illustrated in FIG. 8B. In cases in which the sealing material 102 in the recess 100 sinks in this way, there is a possibility of a gap developing between the surface 102A of the sealing material 102 and a weather strip 104, allowing rainwater and the like to penetrate to the vehicle interior.

Figure 7A:
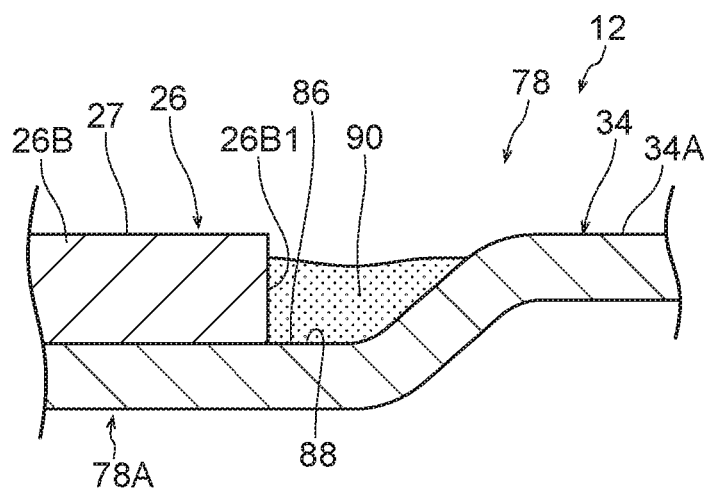
FIG. 7A is a cross-section illustrating a sunken state of a first sealing material with which a recess provided to a joint portion has been filled.
Figure 7B:
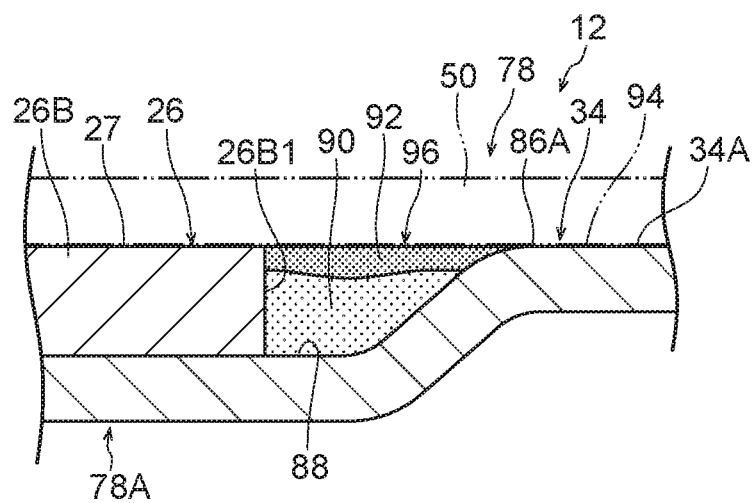
FIG. 7B is a cross-section illustrating a state in which a second sealing material has been filled on top of a first sealing material.

By contrast, in the present exemplary embodiment, as described above, in the first step the recess 88 is filled with the sealing material 90 as illustrated in FIG. 6B, and in a second step, after the sealing material 90 has cured, the recess 88 is filled with the sealing material 92 on top of the sealing material 90, as illustrated in FIG. 7B.

Namely, even if the sealing material 90 with which the recess 88 has been filled sinks during the curing stage of the sealing material 90 as illustrated in FIG. 7A, the sealing material 92 is filled on top of the sealing material 90, enabling the surface 96A of the sealing material 96 to be leveled. In other words, the present exemplary embodiment enables sinking of the surface 96A of the sealing material 96 to be suppressed.

As illustrated in FIG. 5B, in the present exemplary embodiment, the general face 27 of the upper end portion 26B of the center pillar R/F 26 and the general face 34A of the side rail R/F 34 are set in substantially the same plane as each other at the joint portion 78 between the side rail R/F 34 and the upper end portion 26B of the center pillar R/F 26. Moreover, the weather strip 50 abuts the general face 27 of the upper end portion 26B of the center pillar R/F 26 and the general face 34A of the side rail R/F 34 (at the abutting portion 94).

As described above, the present exemplary embodiment suppresses sinking of the surface 96A of the sealing material 96 that has been filled into the recess 88 provided between the general face 27 of the upper end portion 26B of the center pillar R/F 26 and the general face 34A of the side rail R/F 34. The joint portion 78, including the recess 88, can thus be leveled between the general face 27 of the upper end portion 26B of the center pillar R/F 26 and the general face 34A of the side rail R/F 34. This thereby enables penetration of rainwater and the like to the vehicle interior at the joint portion 78 to be suppressed.

In the present exemplary embodiment, a thermosetting sealing material is employed for the sealing material 90 and the sealing material 92. Note that in cases in which the vehicle body member manufacturing process includes a welding process and a coating process, a drying process is also included to dry the vehicle body member in a drying oven after the welding process and after the coating process.

By employing a thermosetting sealing material for the sealing material 90 and the sealing material 92, as illustrated in FIG. 6A and FIG. 6B, during the welding process the recess 88 is applied (filled) with the thermosetting sealing material 90 (the first step). Then, in a drying process following an electrodeposition process performed after the welding process, the thermosetting sealing material 90 is dried and cured. Next, during the coating process, as illustrated in FIG. 7A and FIG. 7B the sealing material 92 is applied (filled) on top of the sealing material 90 including at a sunken portion of the sealing material 90. The sealing material 92 is then dried and cured in a drying process following the coating process.

Namely, in the present exemplary embodiment, the recess 88 formed between the general face 27 of the upper end portion 26B of the center pillar R/F 26 and the general face 34A of the side rail R/F 34 is filled with the first sealing material 90 during the welding process, and the recess 88 is filled with the second sealing material 92 during the coating process, enabling an existing drying process to be utilized without modification. There is accordingly no need to provide a separate drying process specifically related to the filling of the recess 88 with the first sealing material 90 and the second sealing material 92.

Note that as illustrated in FIG. 8A, sinking of the sealing material 102 in the recess 100 of the joint portion 108 generally becomes more pronounced the deeper the fill depth of the sealing material 102. Thus, as illustrated in FIG. 5B, in the present exemplary embodiment the sealing material 92 is set with a shallower (thinner) fill depth than the sealing material 90. Sinking of the second sealing material 92 itself is thus suppressed, thereby suppressing sinking at the surface 96A of the sealing material 96 in the recess 88.

Although not illustrated in the drawings, in a comparative example, a side member outer panel provided to a vehicle body side section configures part of a framework member of the vehicle body side section and also configures a styling face of the vehicle body side section. The side member outer panel is formed with a side door opening, and a side door is attached at the periphery of the side door opening so as to be capable of opening and closing. An outer edge portion of the side door is provided with a weather strip, and the weather strip abuts the side member outer panel so as to suppress rainwater and the like from penetrating to the vehicle interior.

Namely, levelling is demanded at an abutted face of the side member outer panel that is abutted by the weather strip. In cases in which a vehicle body side section is configured by a large side member outer panel molded as a single unit, due to the larger size variation in dimensional precision is greater than in smaller components. Accordingly, assuming the precision requirements are the same, molding large side member outer panels results in poorer yield than when molding smaller components.

Regarding this point, in the present exemplary embodiment, as illustrated in FIG. 2, the side member R/F 12 configuring part of the framework member of the vehicle body side section 14 is configured from plural members. As illustrated in FIG. 5B, the present exemplary embodiment is capable of suppressing sinking of the sealing material 96 filled into the recess 88 provided between the general face 27 of the upper end portion 26B of the center pillar R/F 26 and the general face 34A of the side rail R/F 34 at the joint portion 78 between the side rail R/F 34 and the upper end portion 26B of the center pillar R/F 26, as described above. Accordingly, it is possible to level between the general face 27 of the upper end portion 26B of the center pillar R/F 26 and the general face 34A of the side rail R/F 34, including at the recess 88.

In this manner, the present exemplary embodiment is capable of suppressing sinking of the sealing material 96 at the joint portion 78 between the respective members, even in cases in which the side member R/F 12 is configured by plural members. This thereby enables levelling to be secured at the abutting portion 94 abutted by the weather strip 50 in the side member R/F 12. Namely, rainwater and the like can be suppressed from penetrating to the vehicle interior even in cases in which the side member R/F 12 is configured by plural members.

As a result, in the present exemplary embodiment, functionality of the members configuring the vehicle body side section 14 can be split between framework members (corresponding to the side member R/F 12) configuring part of a framework member of the vehicle body side section 14, and styling members (corresponding to the quarter panel and the like, not illustrated in the drawings) configuring styling faces of the vehicle body side section 14. This enables a reduction in weight of the respective members, and enables yield to be improved.

Note that in the present exemplary embodiment, as illustrated in FIG. 2, the configuration members configuring the side member R/F 12 are the rocker R/F 18, the front pillar R/F 22, the center pillar R/F 26, the rear pillar R/F 30, and the side rail R/F 34. However, there is no limitation thereto, and these configuration members may be added to or omitted.

Although explanation has been given regarding an exemplary embodiment of the present disclosure, the present disclosure is obviously not limited to the above, and various other modifications may be implemented within a range not departing from the spirit of the present disclosure.

What is claimed is:

1. A vehicle body member manufacturing method, for application to a joint portion of a vehicle body member including a first member that configures a portion of the vehicle body member, and a second member that configures another portion of the vehicle body member, having a stepped portion to which the first member is joined by a welding process, and that, in a state in which the first member is joined with the stepped portion, a recess is provided between the first member and the second member at a joint portion between the first member and the second member and an outer face of the second member is in the same plane as an outer face of the first member, the vehicle body member manufacturing method comprising:
 a first step of filling the recess with a first sealing material during the welding process; and
 a second step of filling the recess with a second sealing material on top of a deformation in the first sealing material during a coating process of the first member and the second member after the first sealing material has cured.

2. The vehicle body member manufacturing method of claim 1, wherein the first sealing material and the second sealing material each comprise a thermosetting sealing material.

3. The vehicle body member manufacturing method of claim 1, wherein the second sealing material has a shallower fill depth than the first sealing material.

4. The vehicle body member manufacturing method of claim 2, wherein the second sealing material has a shallower fill depth than the first sealing material.

5. The vehicle body member manufacturing method of claim 1, wherein the vehicle body member is a side member outer reinforcement configuring part of a framework member of a vehicle body side section.

6. The vehicle body member manufacturing method of claim 2, wherein the vehicle body member is side member outer reinforcement configuring part of a framework member of a vehicle body side section.

7. The vehicle body member manufacturing method of claim 3, wherein the vehicle body member is a side member outer reinforcement configuring part of a framework member of a vehicle body side section.

8. A seal structure for a joint portion of a vehicle body member including a first member that configures a portion of the vehicle body member, and a second member that configures another portion of the vehicle body member, that includes a stepped portion to which the first member is joined, and that, in a state in which the first member is joined, by a welding process, with the stepped portion, a recess is provided between the first member and the second member at a joint portion between the first member and the second member and an outer face of the second member is in the same plane as an outer face of the first member, the seal structure comprising:
 a first sealing material that is filled into the recess during the welding process; and
 a second sealing material that is filled into the recess on top of a deformation in the first sealing material during a coating process of the first member and the second member after the first sealing material has cured.

9. The vehicle body member joint portion seal structure of claim 8, wherein the first sealing material and the second sealing material each comprise a thermosetting sealing material.

10. The vehicle body member joint portion seal structure of claim 8, wherein the second sealing material is thinner than the first sealing material.

11. The vehicle body member joint portion seal structure of claim 9, wherein the second sealing material is thinner than the first sealing material.

12. The vehicle body member joint portion seal structure of claim 8, wherein the vehicle body member is a side member outer reinforcement configuring part of a framework member of a vehicle body side section.

13. The vehicle body member joint portion seal structure of claim 9, wherein the vehicle body member is a side member outer reinforcement configuring part of a framework member of a vehicle body side section.

14. The vehicle body member joint portion seal structure of claim 10, wherein the vehicle body member is a side member outer reinforcement configuring part of a framework member of a vehicle body side section.

15. The vehicle body member manufacturing method of claim 1, wherein:
 a gap is formed between an outer surface of the first sealing material and the outer face of the first member after the first sealing material has cured; and
 the second sealing material is filled into the gap.

16. The vehicle body member manufacturing method of claim 1, wherein an outer surface of the second sealing material is in the same plane as the outer face of the first member.

17. The vehicle body member joint portion seal structure of claim 8, wherein
 a gap is formed between an outer surface of the first sealing material and the outer face of the first member after the first sealing material has cured; and
 the second sealing material is filled into the gap.

18. The vehicle body member joint portion seal structure of claim 8, wherein an outer surface of the second sealing material is in the same plane as the outer face of the first member.

* * * * *